United States Patent
Rosskamp

(10) Patent No.: US 7,652,438 B2
(45) Date of Patent: Jan. 26, 2010

(54) DRIVE ARRANGEMENT FOR A PORTABLE WORKING MACHINE

(75) Inventor: Heiko Rosskamp, Adelberg (DE)

(73) Assignee: Andreas Stihl AG & Co KG, Waiblingen (DE)

( * ) Notice: Subject to any disclaimer, the term of this patent is extended or adjusted under 35 U.S.C. 154(b) by 192 days.

(21) Appl. No.: 11/959,420

(22) Filed: Dec. 18, 2007

(65) Prior Publication Data
US 2008/0150460 A1 Jun. 26, 2008

(30) Foreign Application Priority Data
Dec. 22, 2006 (DE) .................... 10 2006 062 354

(51) Int. Cl.
*H02P 1/00* (2006.01)
(52) U.S. Cl. .................... 318/139; 361/23; 361/31; 361/54; 361/87; 56/233; 56/234; 56/235; 56/236; 56/237; 56/238; 56/239; 30/196; 30/194; 30/165
(58) Field of Classification Search ................. 318/139; 56/10.3, 10.8, 12.7, 233, 234, 235, 236, 237, 56/238, 239; 361/23, 31, 54, 87; 30/196, 30/194, 165
See application file for complete search history.

(56) References Cited

U.S. PATENT DOCUMENTS

| | | | | |
|---|---|---|---|---|
| 3,841,069 A | * | 10/1974 | Weck | 56/10.5 |
| 4,265,597 A | * | 5/1981 | Payne et al. | 417/32 |
| 4,799,126 A | * | 1/1989 | Kruse et al. | 361/101 |
| 4,814,675 A | | 3/1989 | Perilhon | |
| 5,061,889 A | * | 10/1991 | Iwatani et al. | 322/28 |
| 5,262,704 A | * | 11/1993 | Farr | 318/434 |
| 5,388,176 A | | 2/1995 | Dykstra et al. | |
| 5,630,009 A | * | 5/1997 | Hayden | 388/838 |
| 6,122,154 A | * | 9/2000 | Damerow et al. | 361/32 |
| 6,452,349 B1 | * | 9/2002 | Hahn et al. | 318/400.22 |
| 7,012,393 B2 | * | 3/2006 | De Frutos et al. | 318/434 |

(Continued)

FOREIGN PATENT DOCUMENTS

DE 20 41 148 A1 3/1972

(Continued)

OTHER PUBLICATIONS

European Search Report for EP 07 02 1717 (mailed May 20, 2008).

*Primary Examiner*—Rita Leykin
(74) *Attorney, Agent, or Firm*—Klarquist Sparkman, LLP

(57) ABSTRACT

A drive arrangement for a hand-guided working machine for agriculture, forestry and horticulture applications. The drive arrangement comprises an electric motor, a DC power source for electrical energy, and a control apparatus for the electric motor which is fed from the DC power source. The electric motor has a specific, in particular linear, characteristic curve between the electric current which is consumed by the electric motor and the rotational speed of an output shaft of the electric motor. The control apparatus has current-limiter which limits the current which flows through the electric motor to a maximum value in order to protect the electric motor against overloading. The control apparatus limits the current consumption of the electric motor in a range of low rotational speeds to values which are considerably smaller than the characteristic curve values which are given for these rotational speeds by the characteristic curve of the electric motor, as a function of the rotational speed.

15 Claims, 3 Drawing Sheets

U.S. PATENT DOCUMENTS

| | | | |
|---|---|---|---|
| 7,486,489 B2 * | 2/2009 | Dragoi et al. | 361/23 |
| 7,542,251 B2 * | 6/2009 | Ivankovic | 361/23 |
| 2003/0222607 A1 | 12/2003 | Simizu et al. | |
| 2004/0179829 A1 | 9/2004 | Phillips et al. | |

FOREIGN PATENT DOCUMENTS

| | | |
|---|---|---|
| DE | 34 22 485 A1 | 12/1985 |
| DE | 100 49 755 | 5/2002 |
| DE | 2005 011 578 A1 | 9/2006 |
| EP | 1 139 554 | 10/2001 |
| WO | WO 2005/053915 | 6/2005 |
| WO | WO 2005/053915 A2 | 6/2005 |

* cited by examiner

DRIVE ARRANGEMENT FOR A PORTABLE WORKING MACHINE

CROSS-REFERENCE TO RELATED APPLICATIONS

This application claims the priority of German Patent Application No. DE 10 2006 062 354.1, filed Dec. 22, 2006.

BACKGROUND

The present application relates to a drive arrangement for a mobile, in particular hand-guided or portable, working machine for agriculture, forestry and horticulture applications, comprising an electric motor, a storage means for electrical energy (e.g., a DC power source such as a battery), and a control apparatus for the electric motor which is fed from the DC power source, with the electric motor having a specific, in particular linear, characteristic curve between the electric current which is consumed by the electric motor and the rotational speed of an output shaft of the electric motor, with the control apparatus having a current-limiter which limits the current which flows through the electric motor to a maximum value in order to protect the electric motor against overloading.

This application also relates to a corresponding method for controlling an electric motor, and also to a hand-guided working machine for agriculture, forestry and horticulture applications comprising a drive arrangement of this type.

In virtually all fields of electrical engineering, it is known to use current-limiting means for the purpose of protecting current-carrying components against overloading. These current-limiting means first take effect when the current exceeds specific, predefined limits (for example due to failure of other components, due to incorrect operator control operations etc.). In other words, the current is therefore generally limited to a maximum value independently of the applied voltage and/or independently of the respective electrical resistance.

Document DE 34 22 485 A1 discloses using a temperature-compensated current-limiting means in an electric motor which is intended to drive hand tools and the like. This document proposes measuring the electric current which flows through the motor by means of a current series shunt. Secondly, the temperature of the series shunt is measured by means of an NTC resistor. The temperature of the electric motor is indirectly detected from the temperature of the series shunt. When a critical motor temperature is reached, the current supply is reduced continually, but in a way which can be sensed by the user. In response to this, the user removes the load from the tool, so that the electric motor can rapidly cool down again.

In the field of working machines for agriculture, forestry and horticulture applications, machines which are driven by an internal combustion engine are known. These machines are frequently used in the professional sector. Furthermore, working machines which are driven electrically are known. In this case, it is known, particularly in the field of private use, to feed the electric motor from the mains. This requires connection of a stationary mains plug to the working machine via a cable. Machines of this type generally cannot be used in the professional sector since a mains plug is not available within an appropriate distance. Working machines which are fed from an electrical energy storage means (for example, a NiCd rechargeable battery) are known in the case of electrically driven working machines, both in the private field and in the professional sector. However, rechargeable lithium-based batteries have been used for several years. Rechargeable batteries of this type are generally also suitable for professional working machines, see WO2005/053915 (corresponding to US 2007/010 8944 A1). This document proposes using a current limiter to protect a lithium-based battery.

SUMMARY

Described below are embodiments of an improved drive arrangement for a hand-guided working machine, an improved method for controlling an electric motor for a drive arrangement of this type, and an improved hand-guided working machine for agriculture, forestry and horticulture applications.

In the case of the abovementioned drive arrangement for a mobile, in particular hand-guided or portable, working machine for agriculture, forestry and horticulture applications, comprising an electric motor, a storage means for electrical energy or DC power source, and a control apparatus for the electric motor which is fed from the DC power source, with the electric motor having a specific, in particular linear, characteristic curve between the electric current which is consumed by the electric motor and the rotational speed of an output shaft of the electric motor, with the control apparatus having a current-limiter such as, e.g., a current limiting circuit, which limits the current which flows through the electric motor to a maximum value in order to protect the electric motor against overloading. The control apparatus generally limits the current consumption of the electric motor in a range of low rotational speeds to values which are considerably smaller than the characteristic curve values which are given for these rotational speeds by the characteristic curve of the electric motor.

Electric motors generally have a characteristic curve which exhibits a high current consumption at low rotational speeds and a low current consumption at high rotational speeds. In this case, a high current consumption generally also means a high torque which is emitted by the electric motor.

In contrast, internal combustion engines have a characteristic curve which provides a relatively low torque at low rotational speeds, a relatively high torque in a middle rotational speed range, and a relatively low torque again in a range of high rotational speeds.

In general, the characteristic of electric motors of providing high torques in ranges of low rotational speeds is entirely desirable.

However, the present approach proposes that the current consumption generally, that is to say independently of other parameters, be limited specifically in the range of low rotational speeds. In other words, the control apparatus impresses a new characteristic curve on the electric motor, which characteristic curve causes a lower current consumption in the range of low rotational speeds.

The result of this is that the torque provided by the working machine in the range of low rotational speeds is generally lower than would be possible by means of the electric motor used. Although this appears disadvantageous at first glance, a range of advantages are associated with this.

In working machines for agriculture, forestry and horticulture applications, the working machines are frequently set to a basic rotational speed. Secondly, the load on the electric motor continuously changes, specifically, for example, due to a change in behaviour of the user, due to a change in conditions (for example thick branches/thin branches etc.).

If the load is greatly increased, the rotational speed of the motor reduces. This leads to a relatively severe increase in current and therefore to a relatively high current consumption. This reduces the operating time of the DC power source. The efficiency of the motor is also reduced.

The result of "active" current limiting in the range of low rotational speeds is that the current consumption in such situations is reduced. This extends the operating time of the Dc power source. The user also receives better "feedback" if he exerts excessive force on the working machine. In the case of conventional drive arrangements with an electric motor, this is less apparent to the user since the electric motor then provides a higher torque in the range of low rotational speeds. In contrast, the user of a working machine comprising a drive arrangement according to the present invention receives a better response to his behavior.

Overall, this can also prevent the electric motor from overheating too quickly. General limiting of the current consumption can replace conventional limiting of the current to a maximum current. However, it goes without saying that an additional current-limiting device for preventing overloading of the electric motor, for example a fusible link or the like, may also be present. However, the maximum current of an additional current-limiting device of this type is generally higher than the maximum current permitted by the general current-limiter.

In this case, current consumption is limited in the range of low rotational speeds as a function of the rotational speed. In other words, the current consumption within this range of low rotational speeds is not limited to a single fixed current value. Instead, current limiting within this range can be impressed with different intensities at different rotational speeds. Consequently, the control characteristic curve generated in this way can have a slope which is not equal to zero in the range of low rotational speeds, or have a plurality of sections with different slopes. Non-linear control characteristic curve sections can also be realized in this range.

Furthermore, the present approach permits the power characteristics of the working machine to be set in a manner which is optimum for the application.

Also described are a corresponding method for controlling an electric motor and a hand-guided working machine comprising a drive arrangement.

As mentioned, the current consumption in the range of low rotational speed is limited generally, that is to say substantially independently of other operating parameters of the drive arrangement.

In particular, the current consumption can be generally limited independently of the temperature of the electric motor.

According to a further preferred embodiment, the control apparatus divides the rotational speed range which is prespecified by the characteristic curve of the electric motor into a plurality of at least three rotational speed ranges, with a control characteristic curve section with a shallower slope than the characteristic curve of the electric motor being established at least in a middle rotational speed range.

In this embodiment, "active" current limiting is established as early as in a middle rotational speed range.

As a result, the control characteristic curve of the control apparatus in the middle range can be matched, for example qualitatively and/or quantitatively, to the characteristic curve of an internal combustion engine. This permits operation of a specific type of working machine independently of whether the machine is driven by a drive arrangement according to the invention or by a drive arrangement comprising an internal combustion engine. The user therefore does not have to prepare for different types of operation.

It is particularly advantageous here when a control characteristic curve section with a slope which is shallower than the slope of the control characteristic curve section in the middle rotational speed range is established in a lower rotational speed range.

This permits relatively more intense active current limiting at low rotational speeds than at medium rotational speeds.

Furthermore, current limiting can be approximately continuously changed from control characteristic curve section to control characteristic curve section. A steady control characteristic profile can be established, so that smooth operation of the working machine is possible.

According to a particularly preferred embodiment, the slope of the control characteristic curve section is zero in the lower rotational speed range.

In this way, the current can be relatively severely limited for the range of very low rotational speeds, in order to thus counteract overloading of the motor and excessive drawing of power from the DC power source.

The control characteristic curve sections can generally have any desired shape, but are preferably linear in each case. In general, the control characteristic curve ranges preferably have a positive slope or a slope of zero. However, it is generally also feasible to establish in the range of very low rotational speeds a control characteristic curve section with a negative slope.

Overall, it is also preferred when current consumption is substantially not limited in an upper rotational speed range.

Since the torque which is provided in this range is relatively low anyway on account of the low currents, to be precise on account of the characteristic curve of the electric motor, the current consumption is preferably not limited in this range.

Overall, it is also preferred when the control apparatus generally limits the current consumption of the electric motor at least in the range of low rotational speeds to values which are at least 20% lower than the characteristic curve values which are given for these rotational speeds by the characteristic curve of the electric motor.

As a result, energy is effectively saved in this rotational speed range.

Overall, the control characteristic curve is preferably matched to the respective application of the working machine, so that different control characteristic curves can be given for the same electric motor and different working machines.

It is also preferred when the current is limited on the basis of voltage regulation. In this case, the control variable can be either a measured rotational speed or a characteristic diagram which is characteristic of each electric motor.

In one method, it is preferred when the current is limited so as to optimize efficiency. In other words, this means that the overall efficiency of the hand-guided working machine is improved by the type of current limiting, so that, overall, a longer operating time can be achieved with a prespecified rechargeable battery charge.

Furthermore, the user can be "controlled" by means of current limiting and the torque profile such that he operates the machine with or close to optimum efficiency.

According to another embodiment, the control characteristic curve which is generated by current limiting contains a hysteresis section in the region in which current is limited.

In other words, the current within the hysteresis section is limited differently depending on whether the rotational speed is increased or reduced.

In this case, it is advantageous when the hysteresis section is designed such that a relatively high current is consumed when the rotational speed is increased, and such that a relatively lower current is consumed when the rotational speed is reduced.

In other words, this can result in the current consumption being relatively severely shaped when the rotational speed is reduced (for example due to a higher load), so that considerable energy savings can be achieved.

If, on the other hand, the rotational speed is increased, for example when the electric motor starts from a standstill, a high breakaway torque may be desired in some applications (for example in power saws or hedge shears) so that current is limited only relatively slightly when the rotational speed is increased.

According to a further embodiment, the control characteristic curve which is generated by the current being limited contains in the region in which current is limited a section in which the control characteristic curve has a negative slope.

In this embodiment, the control characteristic curve even more clearly approximates the typical characteristic curve of an internal combustion engine which generally also has a maximum torque even in a middle rotational speed range, and, particularly in the range of low rotational speeds, can provide only a low torque.

By means of this measure, the behavior of the hand-guided working machine can also be largely the same for the user, irrespective of whether the working machine is driven by an internal combustion engine or by an electric motor.

As an alternative to this, it is also possible for the control characteristic curve which is generated by the current being limited to contain in the region in which current is limited a breakaway section in which a very high current is consumed when the electric motor starts from a standstill.

As mentioned above, such a breakaway torque which is generated in this way may be highly advantageous for some applications. In general, the breakaway section can be designed to be relatively narrow, so that a high breakaway torque is actually provided only at very low rotational speeds, but current is limited in a manner which is optimum for efficiency at all other rotational speeds in the control characteristic curve section.

The rotational speed of the electric motor, as a function of which the current consumption is limited, can be measured, for example, by means of a rotational speed sensor.

However, it is preferred when the rotational speed is derived from the electrical variables of the electric motor, such as the voltage and/or the electric current which is consumed by the electric motor.

A separate rotational speed sensor is not required in this embodiment.

It goes without saying that the abovementioned features and those which are still to be explained below can be used not only in the specified combinations but also in other combinations or on their own, without departing from the scope of the described subject matter.

BRIEF DESCRIPTION OF THE SEVERAL VIEWS OF THE DRAWING

Exemplary embodiments are explained in greater detail in the following description and are illustrated in the drawings, in which.

DETAILED DESCRIPTION

Figure 1:
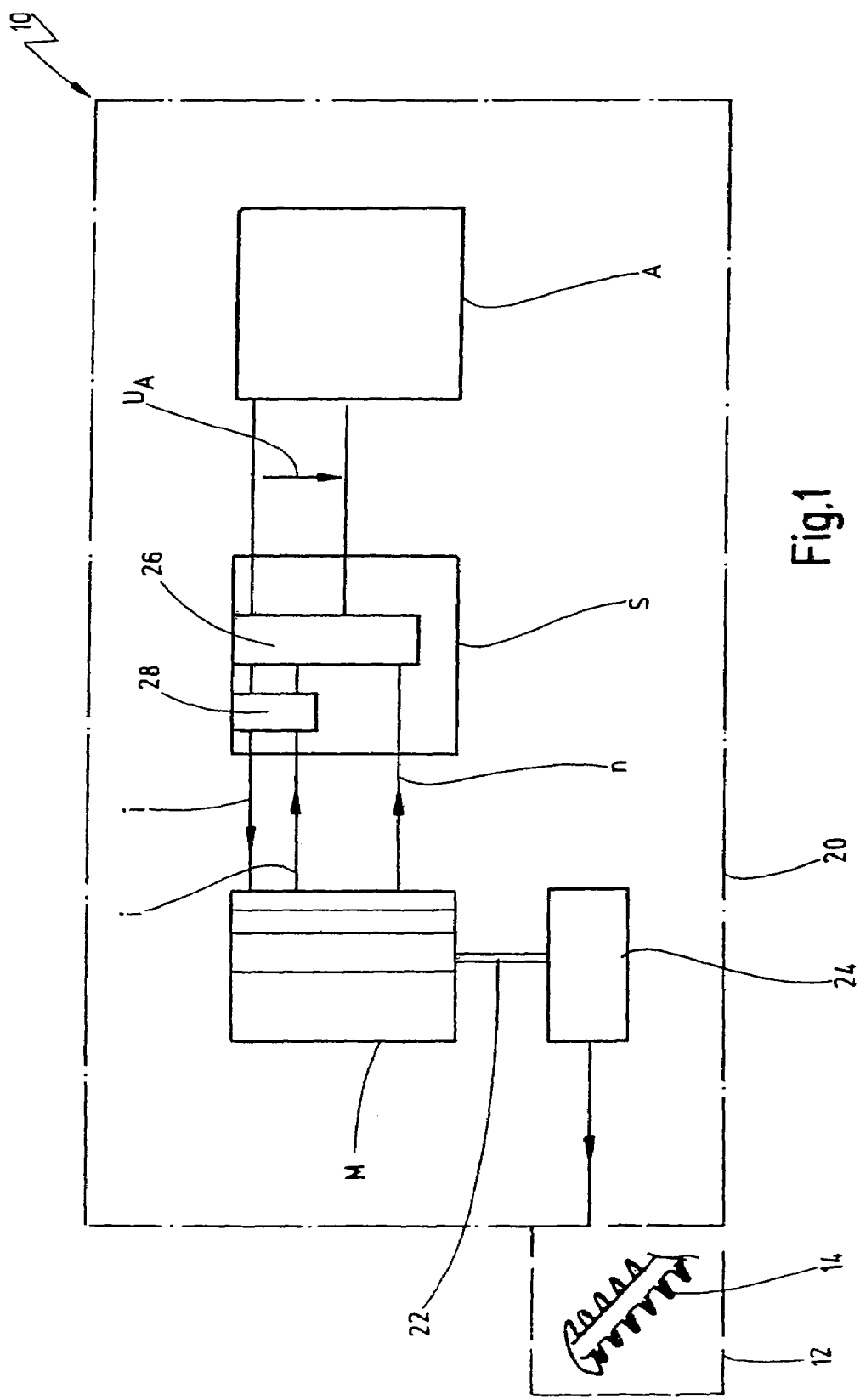
FIG. 1 shows a schematic illustration of a working machine for agriculture, forestry and horticulture applications, comprising a drive arrangement.

In FIG. 1, a working machine for agriculture, forestry or horticulture applications is schematically denoted 10.

The working machine 10 has a tool 12, which is schematically indicated in the present case as a blade 14 of hedge shears, and a drive arrangement which is denoted 20 in general.

As indicated by the blade 14, the working machine may be hedge shears. Other examples of working machines 10 include trimmers, lawn edgers, chainsaws, ground-boring machines, blower machines, vacuum shredders, motor scythes, cut-off saws, vacuum apparatuses (wet or dry), mist blowers and blower machines, high-pressure cleaners, lawn mowers etc.

The working machine 10 is preferably in the form of a hand-guided working machine which can be carried or guided by an operator. The working machine 10 is generally designed for professional use.

The drive arrangement 20 has an electric motor M, a control apparatus S and an electrical energy store or DC power source in the form of a rechargeable and replaceable rechargeable battery pack A.

The DC power source A provides a supply voltage $U_A$, for the control apparatus S. The control apparatus S supplies the electric motor M with an electric current i. The electric motor M has an output shaft 22. The output shaft 22 is either coupled to the tool 12 directly or else by means of any desired converter, for example a rotation/translation converter, a step-down gear mechanism and/or the like. A converter of this type is schematically shown by 24 in FIG. 1.

The control apparatus S firstly has a power electronics system 28, which is known per se, for actuating the electric motor M. The power electronics system 28 can also be formed separately from the control apparatus S. The control apparatus S also has a current-limiter 26.

The current-limiter 26 serves to impress on the electric motor M a control characteristic curve in which the current consumption of the electric motor M is generally limited in the range of low and possibly medium rotational speeds. The current-limiter 26 receives the output voltage $U_A$ at the input end. The current-limiter 26 is also supplied with information about the rotational speed n of the output shaft 22.

The current-limiter 26 can impress the control characteristic curve on the electric motor M in any desired manner. This is preferably done by a voltage regulation means which can include, for example, the rotational speed n as the control variable.

As an alternative, it is possible to store a characteristic diagram in the control apparatus S, the characteristic diagram being characteristic of the respective electric motor M and establishing fixed relationships between rotational speed, current and voltage.

Figure 2:
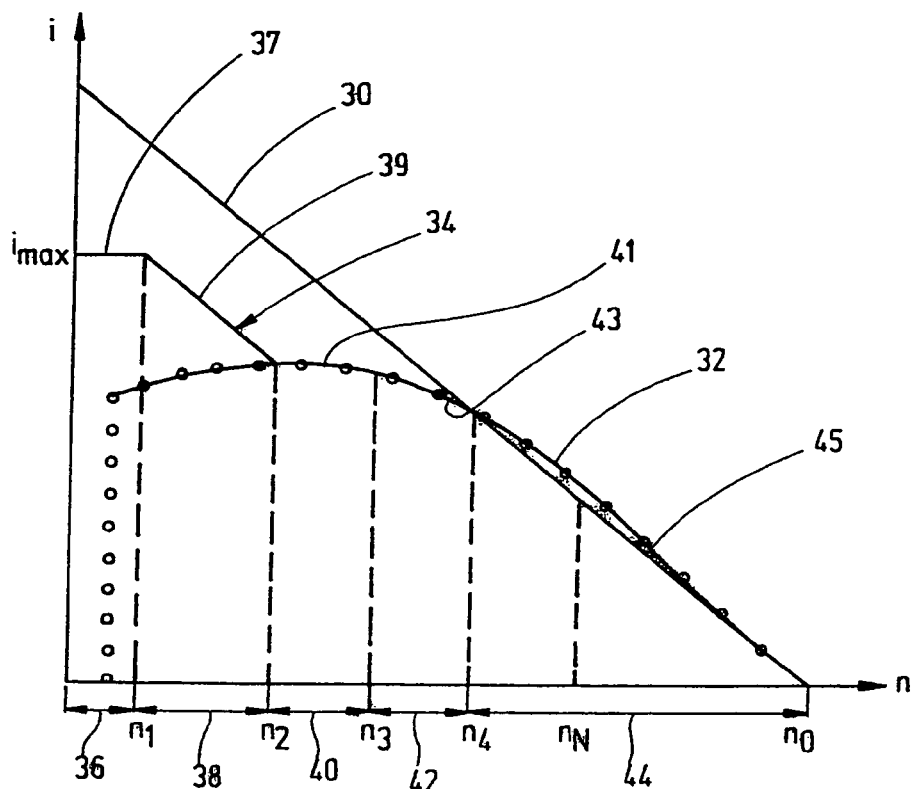
FIG. 2 shows a graph of current against rotational speed, showing a characteristic curve of an electric motor, a characteristic curve of an internal combustion engine and a control characteristic curve.

FIG. 2 shows a graph of motor current i against rotational speed n. A characteristic motor curve 30 of the electric motor M is firstly plotted in the graph of FIG. 2. The motor characteristic curve 30 is a customary characteristic curve of an electric motor and runs substantially linearly from a relatively high current at low rotational speeds to a low current at high rotational speeds.

FIG. 2 also illustrates with a dotted line the characteristic curve 32 of an internal combustion engine, as is typically used in working machines for agriculture, forestry or horticulture applications. Starting from a certain no-load rotational speed, an internal combustion engine can first emit a torque which is initially relatively low in the range of the no-load rotational speed. In the range of medium rotational speeds, the torque then increases to some extent and drops again at high rotational speeds. At high rotational speeds, the characteristic curve 32 of the internal combustion engine can correspond substantially to the characteristic curve 30 of the electric motor M. However, the characteristics of the characteristic curves 30, 32 are completely different at medium and low rotational speeds. In an electric motor, the energy requirement and consequently the provided torque increase greatly at low rotational speeds. In an internal combustion engine, the provided torque drops at low rotational speeds. In this context, it goes without saying that, for the characteristic curve 32, the y axis corresponds to the torque emitted by the internal combustion engine, that is to say is, for example, proportional to the throttle valve position. For a typical electric motor, the motor current is likewise proportional to the specified torque.

The current-limiter 26 now impresses on the electric motor M a control characteristic curve which is denoted 34 in FIG. 2.

The control characteristic curve 34 is made up of a multiplicity of control characteristic curve sections. In this case, the rotational speed range covered by the motor characteristic curve 30 is divided into a plurality of individual rotational speed ranges, specifically a first rotational speed range 36 which contains low rotational speeds, a second rotational speed range 38 which contains somewhat higher rotational speeds, a third rotational speed range 40 which follows the rotational speed range 38 and contains medium rotational speeds, a fourth rotational speed range 42 which follows the rotational speed range 40 and likewise contains medium rotational speeds, and a fifth rotational speed range 44 which follows the fourth rotational speed range 42 and contains higher rotational speeds up to the maximum rotational speed.

In the first rotational speed range 36, the control characteristic curve 34 has a control characteristic curve section 37 which is of linear form, to be precise with a slope of zero. The control characteristic curve section 37 represents the maximum motor current $i_{max}$ which is, for example, at least about 15%, about 20% or about 30% below the current which would be reached in this rotational speed range 36 with the normal characteristic curve 30.

In the second rotational speed range 38, the control characteristic curve 34 has a second control characteristic curve section 38 which is of linear form and has a slope which corresponds approximately to the slope of the motor characteristic curve 30. In the third rotational speed range 40, the control characteristic curve 34 has a third control characteristic curve section 41 which is again of linear form and has a slope which is considerably shallower than the slope of the motor characteristic curve 30. In the fourth rotational speed range 42, the control characteristic curve 34 has a control characteristic curve section 43 which is again of linear form. The fourth control characteristic curve section 43 has a slope which is between the slope of the control characteristic curve section 41 and that of the control characteristic curve section 39.

It goes without saying in the present context that it is generally the magnitudes of the respective slopes that are compared.

In the fifth rotational speed range 44, the control characteristic curve 34 has a control characteristic curve section 45 which is identical to the corresponding section of the motor characteristic curve 30.

In other words, the motor current i is not limited at all by means of the impressed control characteristic curve 34 in the fifth rotational speed range 44. In the fourth rotational speed range 42, the motor current i is limited to some extent in relative terms. In the third rotational speed range 40, the motor current i is more severely limited in relative terms. In the second rotational speed range 38, current is again limited to a somewhat lower extent in relative terms. In the first rotational speed range 36, the motor current i is constantly limited to a fixed value $i_{max}$, that is to say is very severely limited in relative terms.

Accordingly, the motor current i is "actively" limited by the control characteristic curve 34 in order to reduce the current consumption, particularly at low rotational speeds. Furthermore, the user can be given "feedback" if he "exerts excessive pressure" on the working machine.

In addition, the efficiency of an electric motor M is generally somewhat lower in the range of low rotational speeds. Accordingly, the control characteristic curve 34 according to the invention can reduce the current consumption and increase the efficiency of the working machine 10 overall. Furthermore, the operating time of the DC power source A can be extended, in particular.

All this is done by electronically limiting the motor current to a suitable torque characteristic value which may depend, for example, on the typical application of the working machine. The control characteristic curve 34 of FIG. 2 is therefore to be understood merely as an example.

Figure 3:
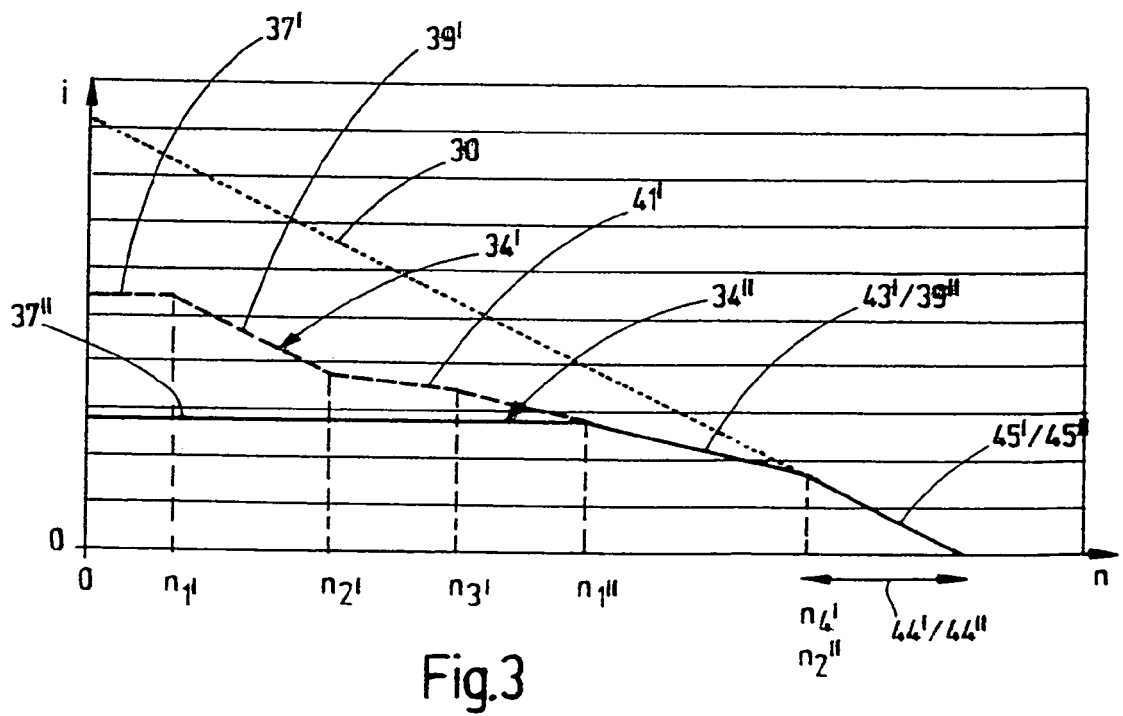
FIG. 3 shows a graph which corresponds to FIG. 2, with different control characteristic curves.

FIG. 3 again illustrates two alternative control characteristic curves 34' and 34" in addition to a motor characteristic curve 30.

The control characteristic curve 34' is divided into five control characteristic curve sections 37', 39', 41', 43', 45'— qualitatively substantially comparable with the control characteristic curve 34 of FIG. 2.

The control characteristic curve 34" is divided into only three rotational speed ranges over the available rotational speed range, with a first control characteristic curve section 37" in which the motor current i is limited to a fixed value, with a last control characteristic curve section 45" in which the control characteristic curve 34" corresponds to the motor characteristic curve 30, and a middle control characteristic curve section 39" which has a slope which is somewhat shallower than the motor characteristic curve 30.

The following generally applies for the control characteristic curves 34, 34', 34". In a middle rotational speed range, the control characteristic curve 34 preferably approximates the characteristic of the internal combustion engine 32. In a range of low rotational speeds, use is also made of the general advantage of the electric motor M that said electric motor can generally provide relatively high torques in the range of low rotational speeds. However, relatively severe current limiting is already performed in this range. As a result, the operating time of the DC power source A, that is to say the time until it is discharged and has to be recharged, is extended in relative terms.

Figure 4:
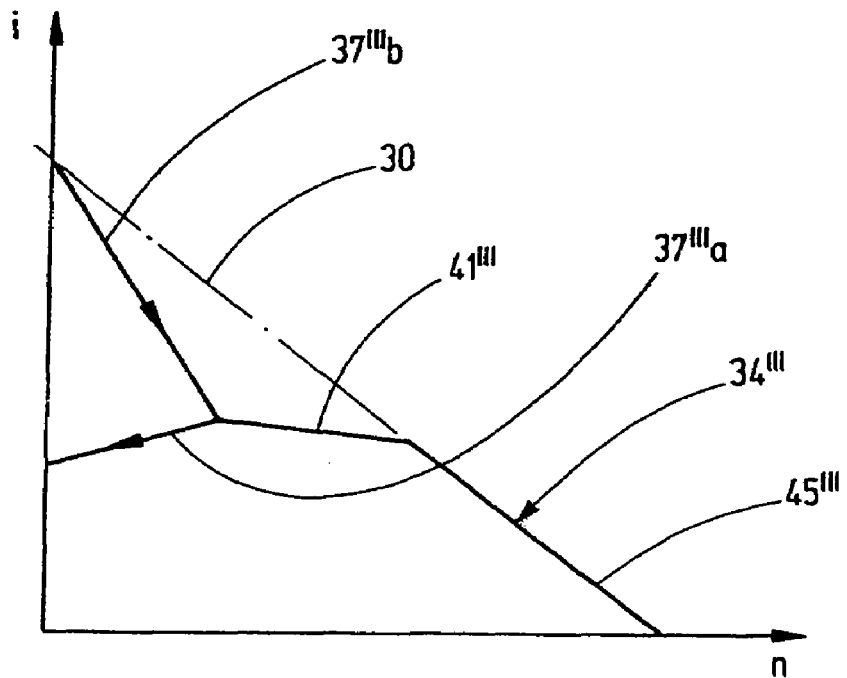
FIG. 4 shows a further graph, with an alternative inventive control characteristic curve with a hysteresis section.
Figure 5:
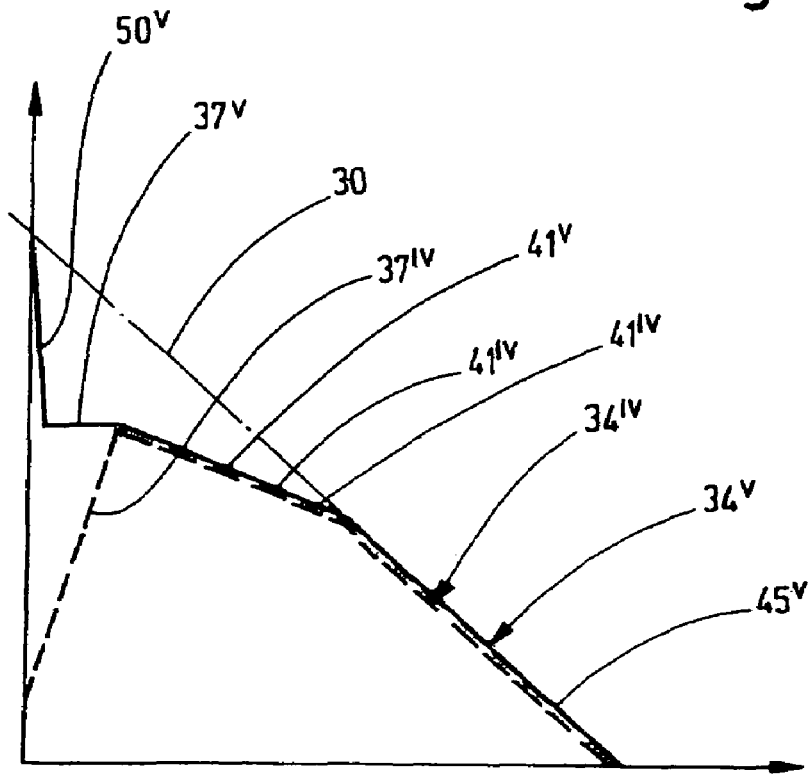
FIG. 5 shows a further graph, with control characteristic curves according to the invention.

FIGS. 4 and 5 illustrate further alternative embodiments of control characteristic curves. The information given above regarding the above-described control characteristic curves applies to these control characteristic curves too. However, special features of the control characteristic curves which are described below are discussed in the text which follows.

FIG. 4 illustrates a control characteristic curve 34''' which has a control characteristic curve section 45''' and a first current-limiting control characteristic curve section 41'''. Furthermore, a second current-limiting control characteristic curve section is formed as a hysteresis section 37a''', 37b'''. The hysteresis section is designed such that a relatively high current 37b''' is consumed when the rotational speed is increased. A relatively lower current 37a''' is consumed when the rotational speed is reduced.

It goes without saying that a hysteresis section of this type preferably, but not necessarily, adjoins rotational speed limits with a rotational speed of zero. It is also advantageous, but not absolutely necessary, when a relatively high torque is provided during starting, for the maximum current at the rotational speed zero to correspond to the maximum current which is emitted by the electric motor M.

In general, the hysteresis section can also be formed such that the normal characteristic curve 30 of the electric motor is generally "used" during starting, and current is limited only in the reversed direction when the rotational speed is reduced.

FIG. 5 illustrates two further control characteristic curves $34^{IV}$, $34^{V}$.

The control characteristic curve $34^{IV}$ has a first, "normal" control characteristic curve section $41^{IV}$ and a second control characteristic curve section $37^{IV}$ in which the slope of the control characteristic curve $34^{IV}$ is negative.

The shape of the control characteristic curve $34^{IV}$ therefore generally corresponds to the shape of the characteristic curve of an internal combustion engine, as shown by 32 in FIG. 2.

In the range $50^{V}$ which adjoins the rotational speed zero, the control characteristic curve $34^{V}$ has a steep slope, so that a relatively high drive torque, which can be used as a breakaway torque, can be established during starting of the electric motor.

In the above description, it goes without saying that the magnitude of the slope is generally what is meant when a slope of a characteristic curve or of a characteristic curve section is mentioned.

What is claimed is:

1. Drive arrangement for a hand-guided working machine for agriculture, forestry and horticulture applications, comprising an electric motor, a DC power source for electrical energy, and a control apparatus for the electric motor which is fed from the DC power source, with the electric motor having a specific characteristic curve between the electric current which is consumed by the electric motor and the rotational speed of an output shaft of the electric motor, with the control apparatus having current-limiting which limit the current which flows through the electric motor to a maximum value in order to protect the electric motor against overloading,
wherein the control apparatus limits the current consumption of the electric motor in a range of low rotational speeds to values which are considerably smaller than the characteristic curve values which are given for these rotational speeds by the characteristic curve of the electric motor, as a function of the rotational speed.

2. Drive arrangement according to claim 1, wherein the current consumption is limited independently of the temperature of the electric motor.

3. Drive arrangement according to claim 1, wherein the control apparatus divides a rotational speed range which is prespecified by the characteristic curve of the electric motor into a plurality of at least three rotational speed ranges, with a control characteristic curve section with a shallower slope than the characteristic curve of the electric motor being established at least in a middle rotational speed range.

4. Drive arrangement according to claim 3, wherein a control characteristic curve section with a slope which is shallower than the slope of the control characteristic curve section in the middle rotational speed range is established in a lower rotational speed range.

5. Drive arrangement according to claim 4, wherein the slope of the control characteristic curve section is zero in the lower rotational speed range.

6. Drive arrangement according to claim 1, wherein the current consumption is substantially not limited in an upper rotational speed range.

7. Drive arrangement according to claim 1, wherein the control apparatus generally limits the current consumption of the electric motor in the range of low rotational speeds to values which are at least 20% lower than the characteristic curve values which are given for the low rotational speeds by the characteristic curve of the electric motor.

8. A method for controlling an electric motor for a portable working machine having a drive arrangement, comprising:
providing an electric motor having a specific characteristic curve between an electric current which is consumed by the electric motor and a rotational speed of an output shaft of the electric motor;
feeding the electric motor from a DC power source for electrical energy;
limiting the current which flows through the electric motor to a maximum value in order to protect the electric motor against overloading, with the current consumption of the electric motor in a range of low rotational speeds generally being limited to values which are considerably lower than characteristic curve values which are given for these rotational speeds by the characteristic curve of the electric motor.

9. The method according to claim 8, wherein the current is limited to optimize efficiency.

10. The method according to claim 8, wherein the control characteristic curve which is generated by the current is limited comprises a hysteresis section in the region in which current is limited.

11. The method according to claim 10, wherein the hysteresis section is designed such that a relatively high current is consumed when the rotational speed is increased, and such that a relatively lower current is consumed when the rotational speed is reduced.

12. The method according to claim 8, wherein the control characteristic curve which is generated by the current is limited comprises, in the region in which current is limited, a section in which the control characteristic curve has a negative slope.

13. The method according to claim 8, wherein the control characteristic curve which is generated by the current being limited comprises, in the region in which current is limited, a breakaway section in which a very high current is consumed when the electric motor starts from a standstill.

14. The method according to claim 8, wherein the rotational speed is derived from the electrical variables of the electric motor.

15. Hand-guided working machine comprising a drive arrangement comprising an electric motor, a DC power source for electrical energy, and a control apparatus for the electric motor which is fed from the DC power source, with the electric motor having a linear, characteristic curve between the electric current which is consumed by the electric motor and the rotational speed of an output shaft of the electric motor, with the control apparatus having a current-limiter which limits the current which flows through the electric motor to a maximum value in order to protect the electric motor against overloading, wherein the control apparatus limits the current consumption of the electric motor in a range of low rotational speeds to values which are considerably smaller than characteristic curve values which are given for the low rotational speeds by a characteristic curve of the electric motor, as a function of the rotational speed.

* * * * *